(12) United States Patent
Armstrong et al.

(10) Patent No.: US 7,308,530 B1
(45) Date of Patent: Dec. 11, 2007

(54) ARCHITECTURE FOR A DATA STORAGE DEVICE

(75) Inventors: Alan Armstrong, Los Altos, CA (US);
Justin Heindel, Los Gatos, CA (US);
Sehat Sutardja, Los Altos Hills, CA (US); Saeed Azimi, Union City, CA (US); Joseph Sheredy, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 303 days.

(21) Appl. No.: 10/679,030

(22) Filed: Oct. 2, 2003

(51) Int. Cl.
*G06F 12/00* (2006.01)
(52) U.S. Cl. ..................................... 711/112
(58) Field of Classification Search ................ 711/203, 711/112; 710/74
See application file for complete search history.

(56) References Cited

U.S. PATENT DOCUMENTS

| | | | | |
|---|---|---|---|---|
| 5,287,459 A * | 2/1994 | Gniewek | ..................... | 711/111 |
| 5,745,671 A * | 4/1998 | Hodges | .......................... | 714/6 |
| 5,751,514 A * | 5/1998 | Hyde et al. | .............. | 360/97.01 |
| 5,991,399 A * | 11/1999 | Graunke et al. | ............ | 380/279 |
| 6,418,474 B1 * | 7/2002 | Morris | ....................... | 709/233 |
| 6,553,471 B1 * | 4/2003 | O'Hare et al. | .............. | 711/163 |
| 6,725,342 B1 * | 4/2004 | Coulson | ..................... | 711/141 |
| 2002/0178320 A1 * | 11/2002 | Wu | ............................. | 710/306 |
| 2003/0002198 A1 * | 1/2003 | Subrahamanyan et al. | ........................ | 360/77.02 |
| 2004/0111634 A1 * | 6/2004 | Ingman et al. | .............. | 713/201 |
| 2005/0005044 A1 * | 1/2005 | Liu et al. | ...................... | 710/74 |

OTHER PUBLICATIONS

"Serial ATA: High Speed Serialized AT Attachment", Serial ATA Organization, Revision 1.0, Aug. 29, 2001; pp. 1-306.
Supplements to "Serial ATA: High Speed Serialized At Attachment", Serial ATA Organization, Revison 1.0, Aug. 29, 2001, pp. 1, 2, 3, 4, 5, 7.
Errata to "Serial ATA: High Speed Serialized AT Attachment", Serial ATA Organization, Revision 1.0, Aug. 29, 2001, pp. 1-50.
Intel; 82801EB I/O Controller Hub 5 (ICH5)/Intel 82801ER I/O Controller Hub 5 R (ICH5R); Document No: 252516-001; Datasheet; Apr. 2003; pp. 1-671.

* cited by examiner

*Primary Examiner*—Pierre Bataille
*Assistant Examiner*—Sheng-Jen Tsai

(57) ABSTRACT

A data storage device architecture includes a HDA printed circuit board (PCB) including a spindle motor driver, a read/write arm driver, a read channel driver, and a first input/output (I/O) interface that are arranged on the HDA PCB. An application PCB includes at least one of an application specific integrated circuit and a processor that performs application and hard drive control related processing. A buffer stores application and hard drive control related data. A hard drive controller (HDC), a mapping driver, and a second I/O interface are arranged on the application PCB. The second I/O interface communicates with the first I/O interface. The mapping driver is capable of at least one of mapping logical addresses to physical addresses and monitoring a location of a read/write head.

16 Claims, 15 Drawing Sheets

ARCHITECTURE FOR A DATA STORAGE DEVICE

TECHNICAL FIELD

The present invention relates to data storage devices, and more particularly to an improved architecture for data storage devices.

BACKGROUND

Electronic devices such as computers, laptops, personal video recorders (PVRs), MP3 players, game consoles, set-top boxes, digital cameras, and other electronic devices often need to store a large amount of data. Storage devices such as hard disk drives may be used to meet these storage requirements. The cost of data storage often has a significant impact on the overall cost of the device. Therefore, reducing the cost of data storage can dramatically impact the overall cost of these devices.

Referring now to FIGS. 1 and 2, data storage architecture 10 according to the conventional disk drive technology is shown. A hard drive assembly (HDA) printed circuit board (PCB) 14 includes a buffer 18 arranged thereon that stores data that is associated the control of a hard disk drive. The buffer 18 may employ SDRAM or other types of low latency memory. A processor 22 arranged on the HDA PCB 14 performs processing that is related to the operation of the hard disk drive. A hard disk controller (HDC) 26 communicates with an input/output interface 24 and with a spindle/voice coil motor (VCM) driver 30 and/or a read/write channel 34.

During write operation read/write channel 34 essentially encodes the data to be written onto a read/write device 59, as described in detail hereinbelow. The read/write channel 34 processes the signal for reliability and may include, for example error, correction coding (ECC), run length limited coding (RLL), and the like. During read operations, the read/write channel 34 converts an analog output of the read/write device 59 to a digital signal. The converted signal is then detected and decoded by known techniques to recover the data written on the hard disk drive.

As can be appreciated, one or more of the functional blocks of the HDA PCB 14 may be implemented by a single integrated circuit (IC) or chip. For example, the processor 22 and the HDC 26 may be implemented by a single chip. The spindle/VCM driver 30 and/or the read/write channel 34 may also be implemented by the same chip as the processor 22 and/or the HDC 26.

A hard drive assembly (HDA) 50 includes one or more hard drive platters 52 that include a magnetic coating that stores magnetic fields. The platters 52 are rotated by a spindle motor that is schematically shown at 54. Generally the spindle motor 54 rotates the hard drive platter 52 at a fixed speed during the read/write operations. One or more read/write arms 58 move relative to the platters 52 to read and/or write data to/from the hard drive platters 52. The spindle/VCM driver 30 controls the spindle motor 54, which rotates the platter 52. The spindle/VCM driver 30 also generates control signals that position the read/write arm 58, for example using a voice coil actuator, a stepper motor or any other suitable actuator.

A read/write device 59 is located near a distal end of the read/write arm 58. The read/write device 59 includes a write element such as an inductor that generates a magnetic field. The read/write device 59 also includes a read element (such as a magneto-resistive (MR) element) that senses the magnetic field on the platter 52. The HDA 50 includes a preamp circuit 60, which amplifies analog read/write signals. When reading data, preamp circuit 60 amplifies low level signals from the read element and outputs the amplified signal to the read/write channel device. While writing data, a write current is generated which flows through the write element of the read/write device 59 is switched to produce a magnetic field having a positive or negative polarity. The positive or negative polarity is stored by the hard drive platter 52 and is used to represent data.

Application PCB 70 in FIG. 1 includes a parallel I/O interface 72 that communicates with the parallel I/O interface 24 of the HDA PCB 14. The application PCB 70 further includes an application processor 74 arranged thereon that performs application-related processing. A buffer 78 is also arranged on the application PCB and stores application-related data. The application PCB 70 includes one or more application specific integrated circuits (ASIC) 80 or other custom circuits arranged thereon that perform customer specific functions. Exemplary custom functions include PVR functions, set-top box functions, game console functions, MP3 coding/decoding functions, MPEG coding/decoding functions, encryption, or any other function.

The I/O interfaces 24 and 72 between the application PCB 70 and the HDA PCB 14 can be parallel interfaces as shown in FIG. 1. Alternately, serial interfaces can be used. The serial interfaces can be conventional serial interfaces or serial ATA interfaces.

The application processor 74 addresses data on the hard drive platter 52 using logical addresses but not physical addresses. In other words, the HDA PCB 14 is "smart" and the application processor 74 does not have the flexibility to address the data on the hard drive platter 52 at the physical address level. This lack of flexibility leads to some performance disadvantages. For example, most HDAs employ error correction, which may not be suitable for some data applications such as video. Head location and/or status of sector locations is not known by the application. Therefore, when the application requests data, the application may wait until the head is positioned properly. This interrupt and/or overhead could have been used for other processing tasks.

SUMMARY OF THE DISCLOSURE

In some embodiments, a data storage device architecture includes a data storage device assembly (DSDA) printed circuit board (PCB) with a spindle motor driver, a read/write arm driver, a read channel driver, and a first input/output (I/O) interface that are arranged on the DSDA PCB. The first I/O interface communicates with at least one of the spindle motor driver, the read/write arm driver and the read channel driver. An application PCB includes at least one of an application specific integrated circuit (ASIC) and a processor that performs application related processing. The processor performs hard drive related processing. A buffer stores application related data and hard drive control related data. A data storage device controller (DSDC), a mapping driver, and a second I/O interface are arranged on the application PCB. The second I/O interface communicates with at least one of the processor, the buffer, the mapping driver and the DSDC and with the first I/O interface.

In some embodiments, the mapping driver is capable of mapping logical addresses to physical addresses and/or monitoring a location of a read/write head. A data storage device assembly (DSDA) includes a data storage device platter, a read/write arm, and a read/write device arranged on the read/write arm. A spindle motor communicates with the spindle motor driver and rotates the data storage device platter. A read/write arm actuator communicates with the read/write arm driver and adjusts a position of the read/write arm. A preamp circuit communicates with the read channel driver and the read/write device.

In some embodiments, the ASIC communicates with at least one of the processor, the mapping driver and the buffer. The first I/O interface is a first serial ATA interface and the second I/O interface is a second serial ATA interface. The processor, the ASIC and the DSDC of the application PCB are implemented by a first integrated circuit. The buffer and/or the second I/O interface can also be implemented by the first integrated circuit.

In some embodiments, the application PCB includes a port multiplier that communicates with the second I/O interface and with a plurality of the DSDA and DSDAs. The spindle motor driver and the read/write arm driver are implemented by a second integrated circuit. The read channel driver and/or the first I/O interface can be implemented by the second integrated circuit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
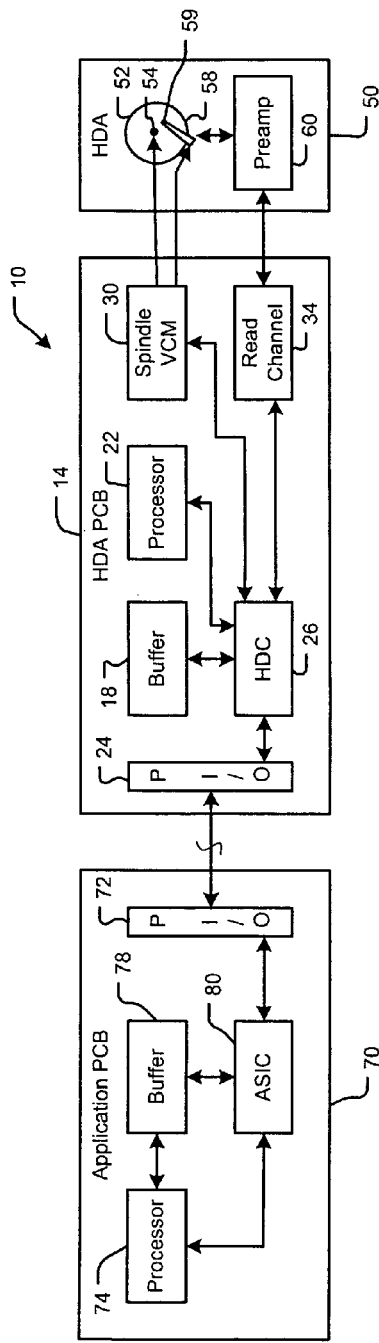
FIG. 1 is a functional block diagram illustrating a data storage device architecture with a parallel interface according to the prior art.
Figure 2:
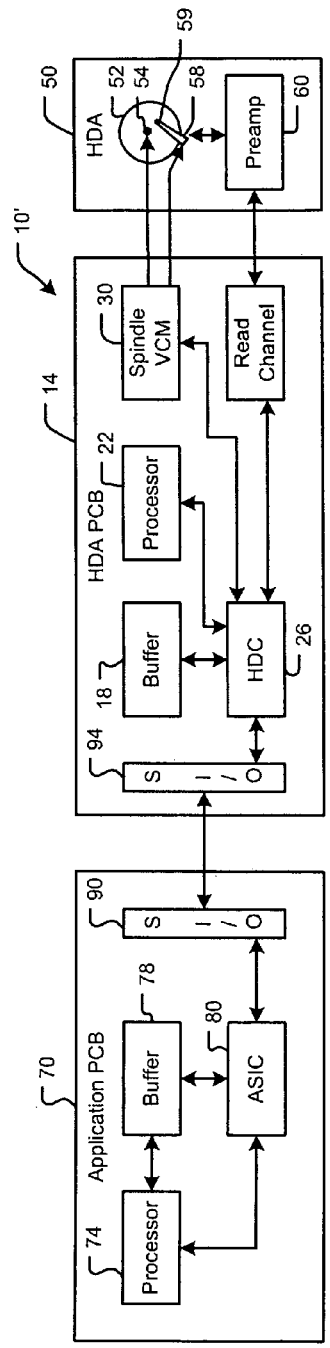
FIG. 2 is a functional block diagram illustrating a data storage device architecture with a serial interface according to the prior art.

The following description of the preferred embodiment(s) is merely exemplary in nature and is in no way intended to limit the invention, its application, or uses. For purposes of clarity, the same reference numbers will be used in the drawings to identify similar elements.

The present invention improves data storage devices and data storage device architectures by simplifying the HDA PCB. The data storage architecture according to the present invention moves processing and/or buffering that is normally arranged on the HDA PCB to the application PCB. The hard drive controller HDC is also optionally moved from the HDA PCB to the application PCB. The processing and/or buffer functions relating to the operation of the hard drive are executed by components arranged on the application PCB. The reduced complexity of the HDA PCB, the shared processor and/or the shared buffer, and/or the ability to highly integrate functions on the application PCB significantly reduces cost. Arranging the hard drive related buffering on the application PCB allows the application to address the data on the disk at the physical level and/or the logical level. Also, the application is also capable of controlling the coding of the data. For example, error correction can be enabled, disabled and/or eliminated as needed. Still other information such as head location and/or status of sector locations can be used to optimize the data storage and retrieval process.

Figure 3:
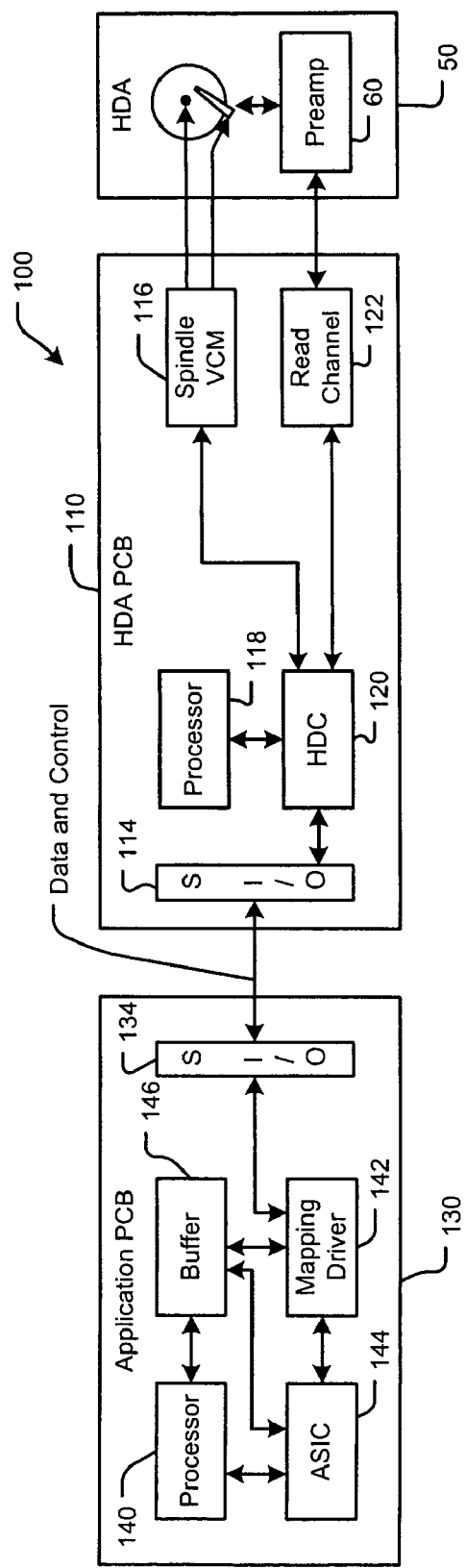
FIG. 3 is a functional block diagram illustrating a data storage device architecture including an application PCB and a buffer-less HDA PCB according to the present invention.

Referring now to FIG. 3, a first data storage device architecture 100 according to the present invention is shown. A bufferless HDA PCB 110 according to the present invention includes a serial I/O interface 114, a spindle/VCM driver 116, a processor 118, a HDC 120, and a read channel driver 122. The HDC 120 communicates with the serial I/O interface 114 and the processor 118. The HDC 120 communicates with the spindle/VCM driver 112 to control the spindle and head position. The HDC 120 also communicates with the read channel driver 122, which communicates with the preamp circuit 60 on the HDA 50. The processor 118 performs processing related to the operation of the hard drive. The HDC 120 relays data to/from the spindle/VCM driver 118 and the read channel driver 122 to the serial I/O interface 114.

An application PCB 130 includes a serial I/O interface 134 that sends and receives data to/from the serial I/O interface 114. The application PCB 130 further includes a processor 140 and a mapping driver 142. The mapping driver 142 is a software module that is executed by a processor or hardware module or circuit that performs mapping of logical to physical addresses and/or management of disk drive read/write head location. The application PCB 130 further includes an ASIC 144 and a buffer 146, which stores application and hard drive related data. Instead of transmitting logical addresses and data over the interfaces 72 and 24 and/or 90 and 94, the application PCB now sends physical addresses and data over the interfaces 134 and 114.

As can be appreciated, mapping of logical and physical addresses and/or control of the read/write head can now be monitored and/or controlled by the application. The processor 118 arranged on the HDA PCB 110 can be simplified since it no longer needs to access a buffer. In other words, the pin count of the processor 118 can be substantially reduced, which lowers the cost of the processor 118 and the HDA PCB 110.

In addition, the HDA PCB 110 and the application PCB 130 include a security function, which allows the application PCB to work with certain restricted types of HDA PCBs and HDAs. For example, a unique key and/or one or more bits or bytes of a link layer or physical layer are used to enable or disable communications between a particular application PCB and a particular HDA PCB, as will be described further below. Still other security techniques in addition to those described above are contemplated. As can be appreciated, the application PCB 130 and the HDA PCB 110, the HDA PCB 110 and HDA 50, or the application PCB 130, the HDA PCB 110, and HDA 50 can be combined onto a single PCB if desired.

Figure 4A:
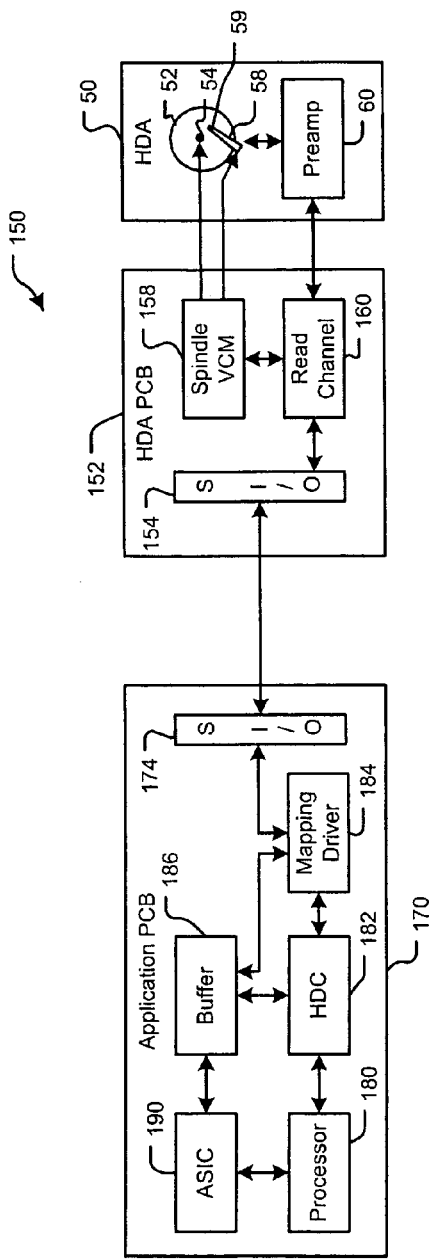
FIG. 4A is a functional block diagram illustrating a data storage device architecture including an application PCB and a buffer-less and processor-less HDA PCB with both data and control information sent in-band over a serial link according to the present invention.

Referring now to FIG. 4A, a second data storage device architecture 150 according to the present invention is shown. A HDA PCB 152 according to the present invention does not include a buffer, a processor or a HDC. The HDA PCB 152 includes a serial I/O interface 154, a spindle/VCM driver 158 and a read channel driver 160. In the embodiment that is shown, the read channel driver 160 communicates with the serial I/O interface 154 and the preamp circuit 60. The read channel driver 160 relays data that is received via the serial I/O interface 154 to the spindle/VCM driver 158. Alternately, the spindle/VCM driver 158 may communicate directly with the serial I/O interface 154 and relay data to the read channel driver 160 or both the spindle/VCM driver 158 and the read channel driver may communicate with the serial I/O interface 154.

An application PCB 170 includes a serial I/O interface 174 that sends and receives data to/from the serial I/O interface 154. The application PCB 170 further includes a processor 180 that performs application and hard drive related processing. The application PCB 170 further includes a HDC 182 and a mapping driver 184. The mapping driver 184 is similar to the mapping driver 142. A buffer 186 stores application and hard disk drive related data. One or more ASICs 190 or other customer specific circuits provide custom functionality. As can be appreciated, locating the HDC 182, the processor and the buffer on the application PCB 170 provides additional cost reduction in addition to the flexibility described above. Instead of transmitting logical addresses and data over the interfaces 72 and 24 and/or 90 and 94, the application PCB now sends hard drive control signals and data over the interfaces 174 and 154. The hard drive control signals include spindle and/or read/write arm control signals.

Figure 4B:
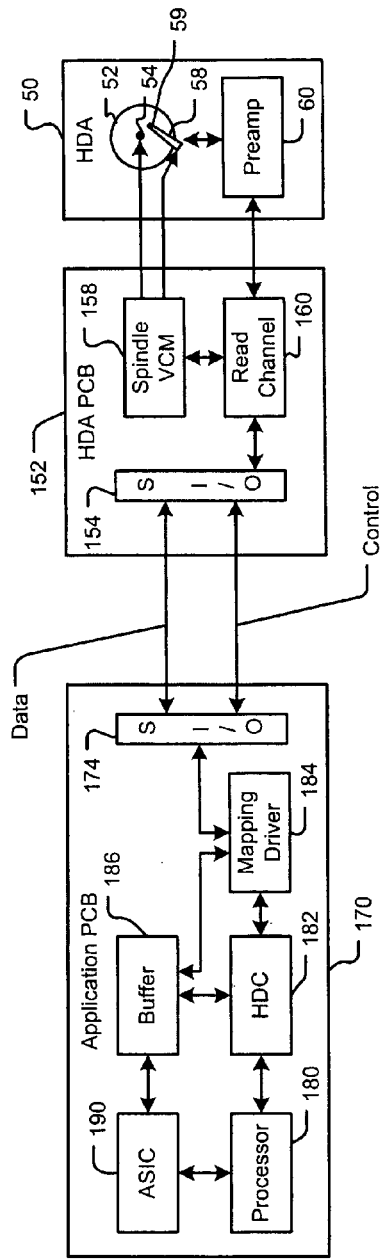
FIG. 4B is a functional block diagram illustrating a data storage device architecture including an application PCB and a buffer-less and processor-less HDA PCB with data sent in-band and control information sent out-of-band over a serial link according to the present invention.

In FIG. 4A, data and control information are sent in-band over the serial link between the HDC and the read channel. In FIG. 4B, data is sent in-band over the serial link to the read channel and control information is sent out-of-band over the serial link.

Figure 5:
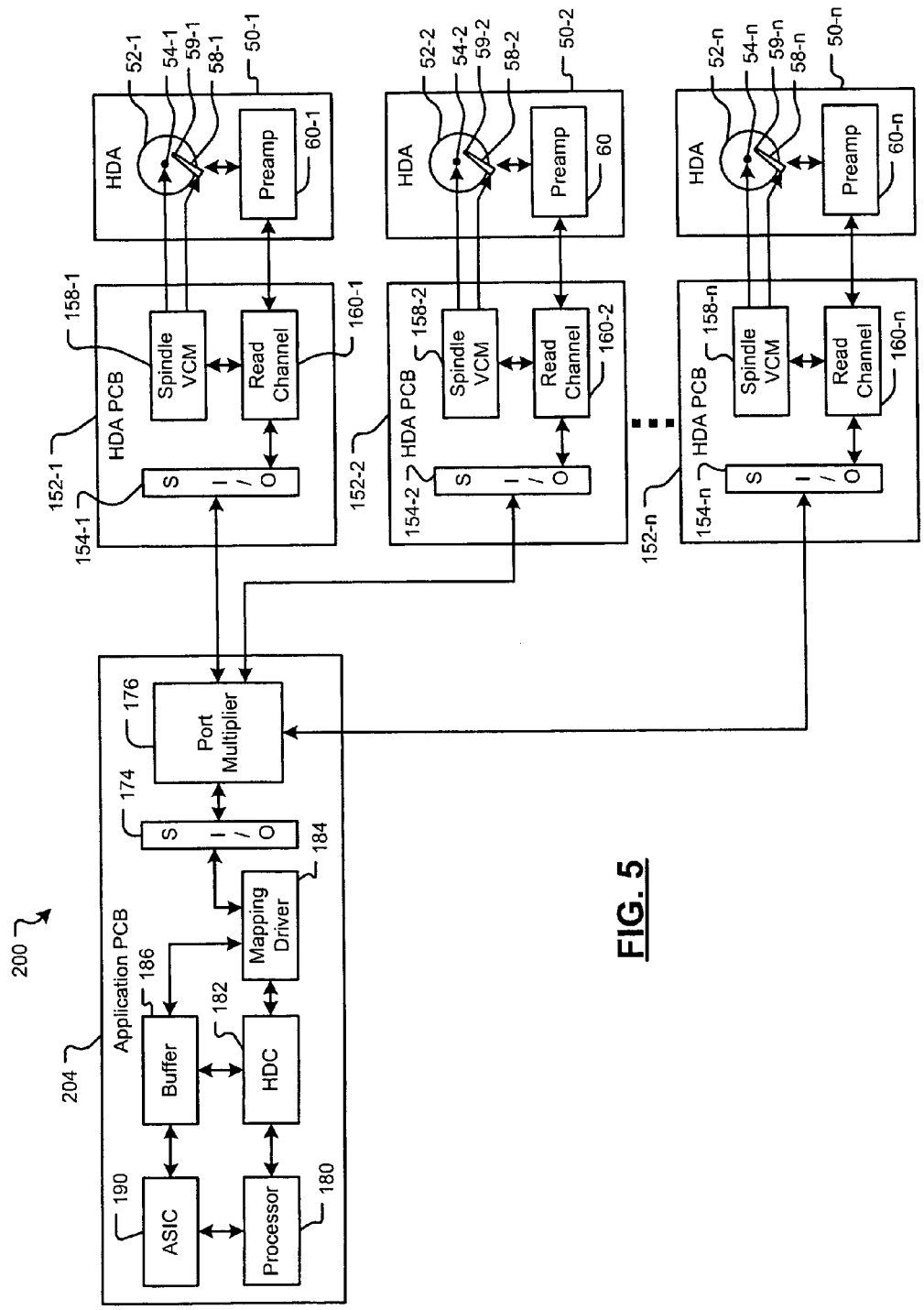
FIG. 5 is a functional block diagram illustrating a data storage device architecture for an application PCB that includes a port multiplier that controls multiple HDA PCBs and HDAs according to the present invention.

Referring now to FIG. 5, another data storage device architecture 200 according to the present invention is shown. The data storage device architecture 200 includes an application PCB 204 that controls two or more HDA PCBs 152 and HDAs 50. The application PCB 204 includes serial I/O interface 174 that communicates with a port multiplier 176. First, second, . . . , and n$^{th}$ HDA PCBs 152-1, 152-2, . . . , and 152-n include first, second, . . . , and n$^{th}$ serial I/O interfaces 154-1, 154-2, . . . , and 154-n. The structure of the HDA PCB's 152-1, 152-2, . . . , and 152-n and HDAs 50-1, 50-2, . . . , and 50-n is similar to the HDA PCB 152 and the HDA 50 that are described above. As can be appreciated, the data storage architecture 100 in FIG. 3 can also be adapted for multiple HDA PCBs 110 and HDAs 50 using a port multiplier.

Figure 6:
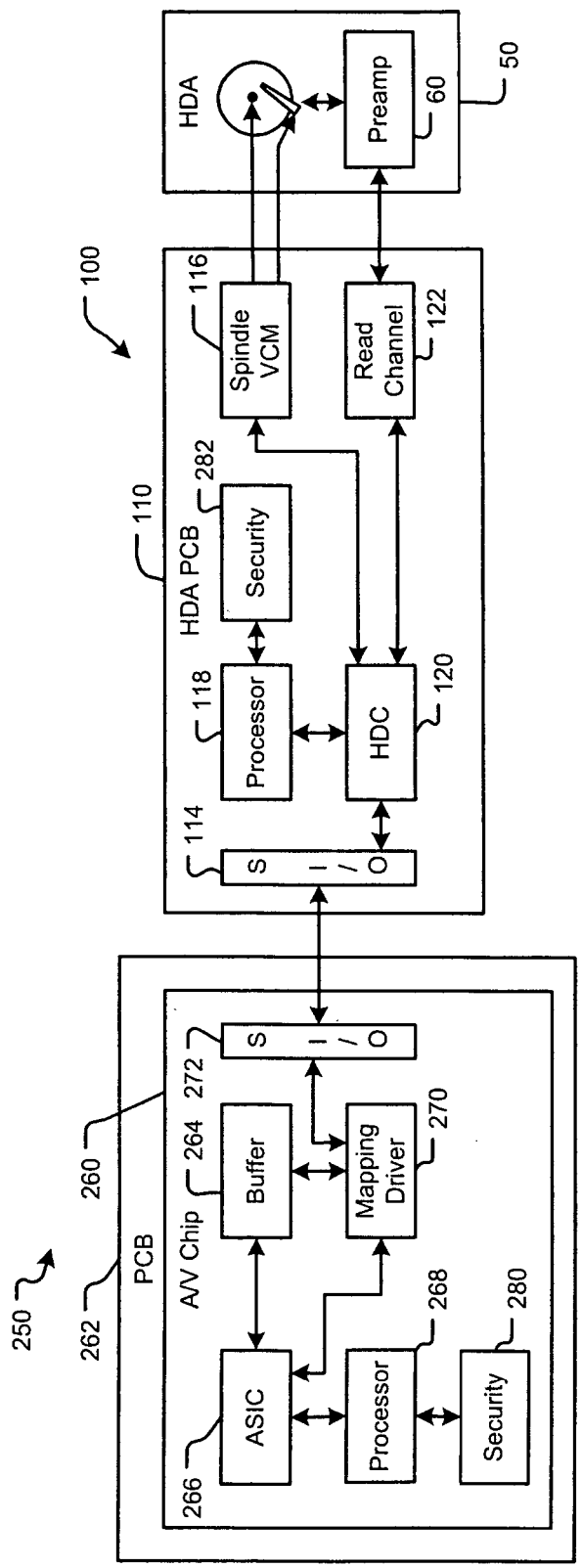
FIG. 6 is one exemplary embodiment of a data storage architecture including an audio/visual (A/V) chip and a bufferless HDA PCB with security.

Referring now to FIG. 6, an exemplary data storage architecture 250 for an audio/visual (A/V) application is shown. The data storage architecture 250 includes the HDA PCB 110 and an A/V chip 260 that is carried by a PCB 262. The A/V chip 260 includes a buffer 264, an ASIC 266, a processor 268, a mapping driver 270 and a serial I/O interface 272 that are connected as shown above in FIG. 3. The HDA PCB 110 and the HDA 50 are functionally similar to those shown in FIG. 3. The A/V chip 260 maps physical and/or logical addresses and/or employs head location data to improve performance. The A/V chip 260 preferably does not perform error correction to improve performance.

Figure 7:
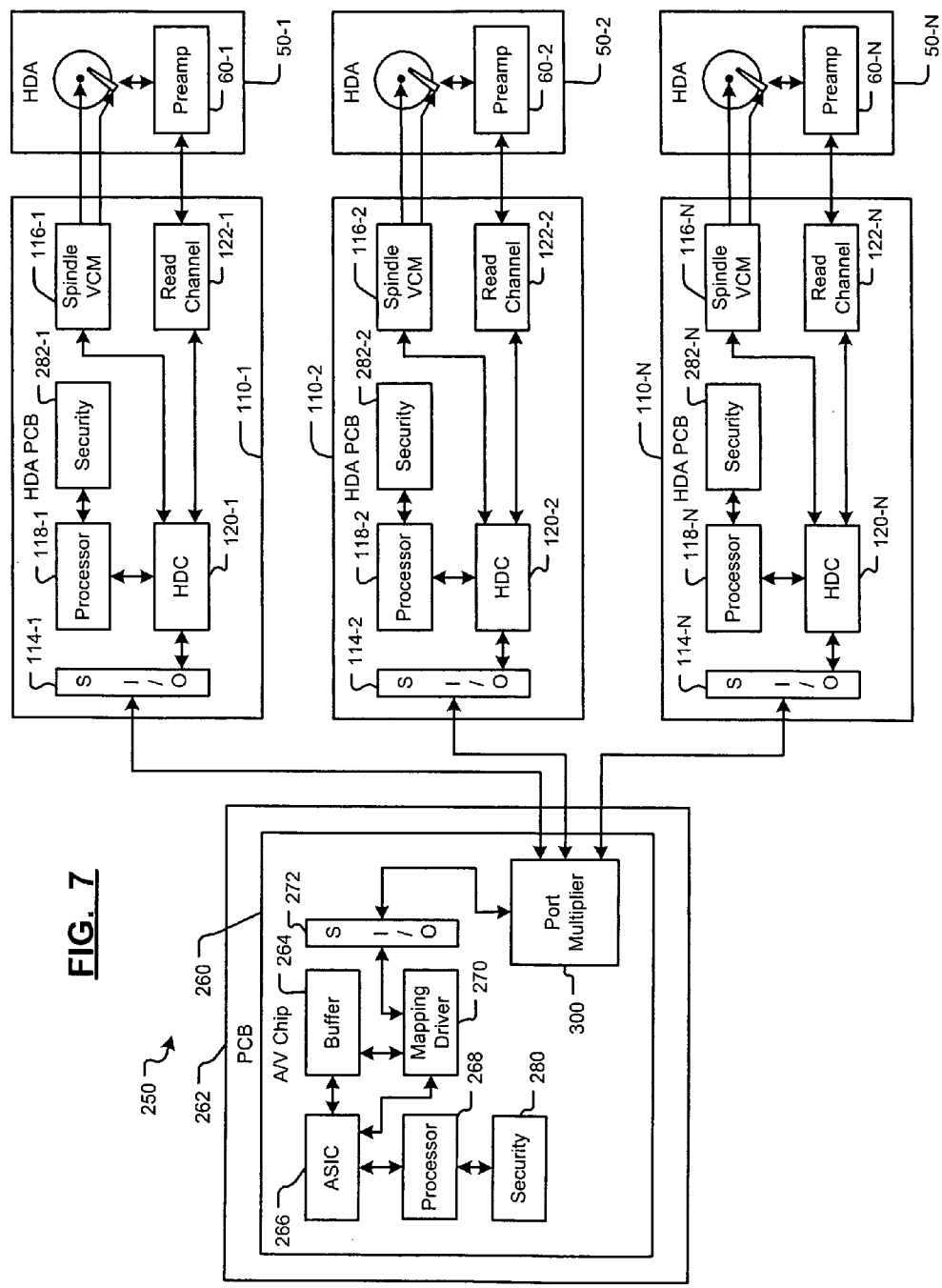
FIG. 7 illustrates the architecture of FIG. 6 with a port multiplier.

The application PCB 262 optionally includes a first security module 280 and the HDC PCB 110 optionally includes a second security module 282. The first and second security modules 280 and 282 employ a password, particular set bits in a link layer or any other method to enforce a security protocol. For example, the A/V chip 260 may be enabled for certain restricted types of HDA PCBs. The security modules may be used to prevent other manufacturers from using their HDA PCBs and/or HDA's with the particular application PCB. Referring now to FIG. 7, the data storage architecture can also be adapted with a port multiplier 300 to address multiple HDA PCBs 110-1, 110-2, . . . , and 110-N and HDAs 50-1, 50-2, . . . , and 50-N.

While the present invention is shown using a serial interface, skilled artisans will appreciate that a parallel interface can be used if desired. While VCM drivers and actuators are shown, any method of controlling the read/ write arm is contemplated. For example, linear stepper motors or any other device can be used. In addition, the interconnections between components and the application PCB and/or HDA PCB can be varied without departing from the invention.

The serial interfaces can be standard serial interfaces. Alternately, the serial interfaces can be serial ATA interfaces. The serial ATA interfaces transmit and receive packetized ATA commands at data rates of 1.5 Gb/s, 3.0 Gb/s and higher. Further details relating to Serial ATA can be found in Serial ATA Specification 1.0a that was released on Feb. 4, 2003 and that is hereby incorporated by reference in its entirety.

Various functional blocks of the HDA PCB and application PCB can be implemented in a single integrated circuit. For example, the processor, the buffer, the HDC, the mapping driver and/or the serial I/O interface can be implemented in a single integrated circuit. Likewise, the serial I/O interface, the spindle/VCM driver and/or the read channel driver can be implemented in a single integrated circuit. As can be appreciated from the foregoing, the data storage architecture according to the present invention reduces the complexity of the HDA PCB, allows increased integration, reduces functional components through processor and/or buffer sharing, and reduces the overall cost of the device. Additional control flexibility is also provided at the application level.

Figure 8:
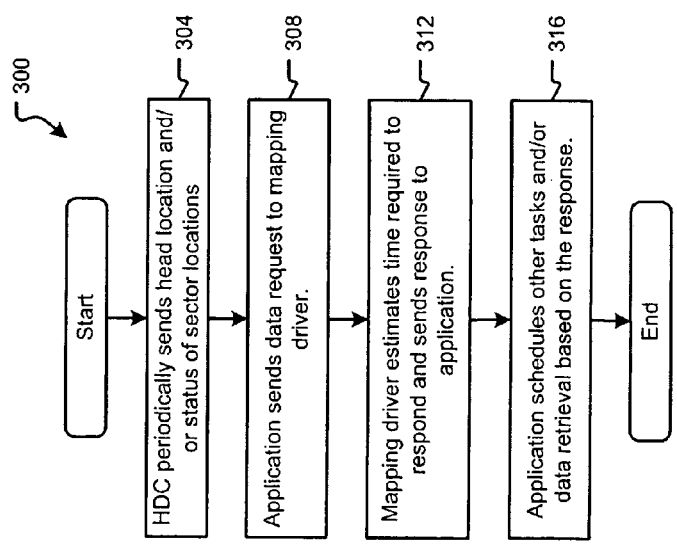
FIG. 8 illustrates steps performed by the application to minimize interrupts and/or overhead using head location and/or sector location data from the HDC.

Referring now to FIG. 8, steps for improving the efficiency of data access is shown generally at 300. In step 304, the HDC periodically sends head location and/or status of sector locations to the mapping driver. The application processor and/or the ASIC sends a data read request to the mapping driver in step 308. In step 312, the mapping driver estimates the time that is required to respond and sends a response to the application and/or ASIC. The application and/or ASIC uses the information to schedule the data retrieval and to minimize interrupts and/or other overhead. For example, based on the head location, the mapping driver estimates that the data retrieval will occur in x microseconds. The application and/or ASIC can accomplish one or more other tasks that are not data access related and then request the data at the appropriate time as shown in step 316.

Figure 9:
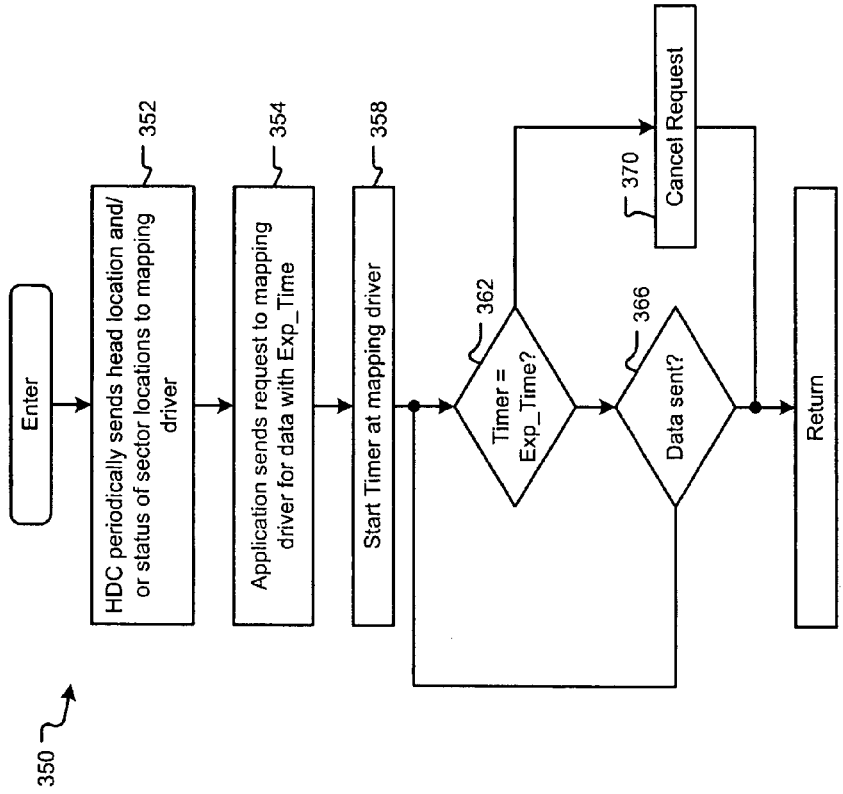
FIG. 9 illustrates steps for setting an expiration time for data access requests.

Referring now to FIG. 9, an alternate method for using the head location and/or status of sector locations is shown generally at 350. In step 352, the HDC periodically sends head location and/or status of sector locations to the mapping driver. In step 354, the application and/or ASIC sends a data request to the mapping driver with an expiration time (Exp_Time). The mapping driver starts a timer in step 358. In step 362, the mapping driver determines whether the timer=Exp_Time. If false, the mapping driver determines whether the data has been sent in step 366. If false, control loops back to step 362. If the timer is equal to Exp_Time, then the mapping driver cancels the data request in step 370.

While the present invention has been described in conjunction with hard drives, skilled artisans will appreciate that the foregoing invention has application to any data storage device including hard disk drives, compact disk (CD) drives (write and/or read/write), digital video disk (DVD) drives (read and/or read/write), optical drives, and/or any other type of data storage device. In addition, data can be sent in-band over the serial link between the HDC and the read channel or data can be sent in-band and control information can be sent out-of-band.

According to the present invention, the HDC can also be integrated with computer chipsets to reduce cost, improve performance, and increase the host computer's control of the HDC. The computer architectures that are shown in FIGS. 10A, 10B, 11A, 11B, 12A, 12B, 13A, and 13B show various levels of integration of the computer chipsets. In these FIGs., the HDC, the mapping driver and the serial I/O interface are integrated with the chipset that performs the I/O functions.

As used herein, the term chipset refers to one or more chips that integrate two or more of the following functions: processing, clock generation, bus and/or bus control, system timers, interrupt controllers, keyboard controllers, a Peripheral Component Interconnect (PCI) bus, graphic processing, memory and/or memory control, bridging, basic input/output system (BIOS), instructions set architecture (ISA) bus, etc. The PCI bus defines a local bus that allows PCI-compliant expansion cards to be installed on the computer. The PCI bus also provides control that allows data to be exchanged with the processor.

Figure 10A:
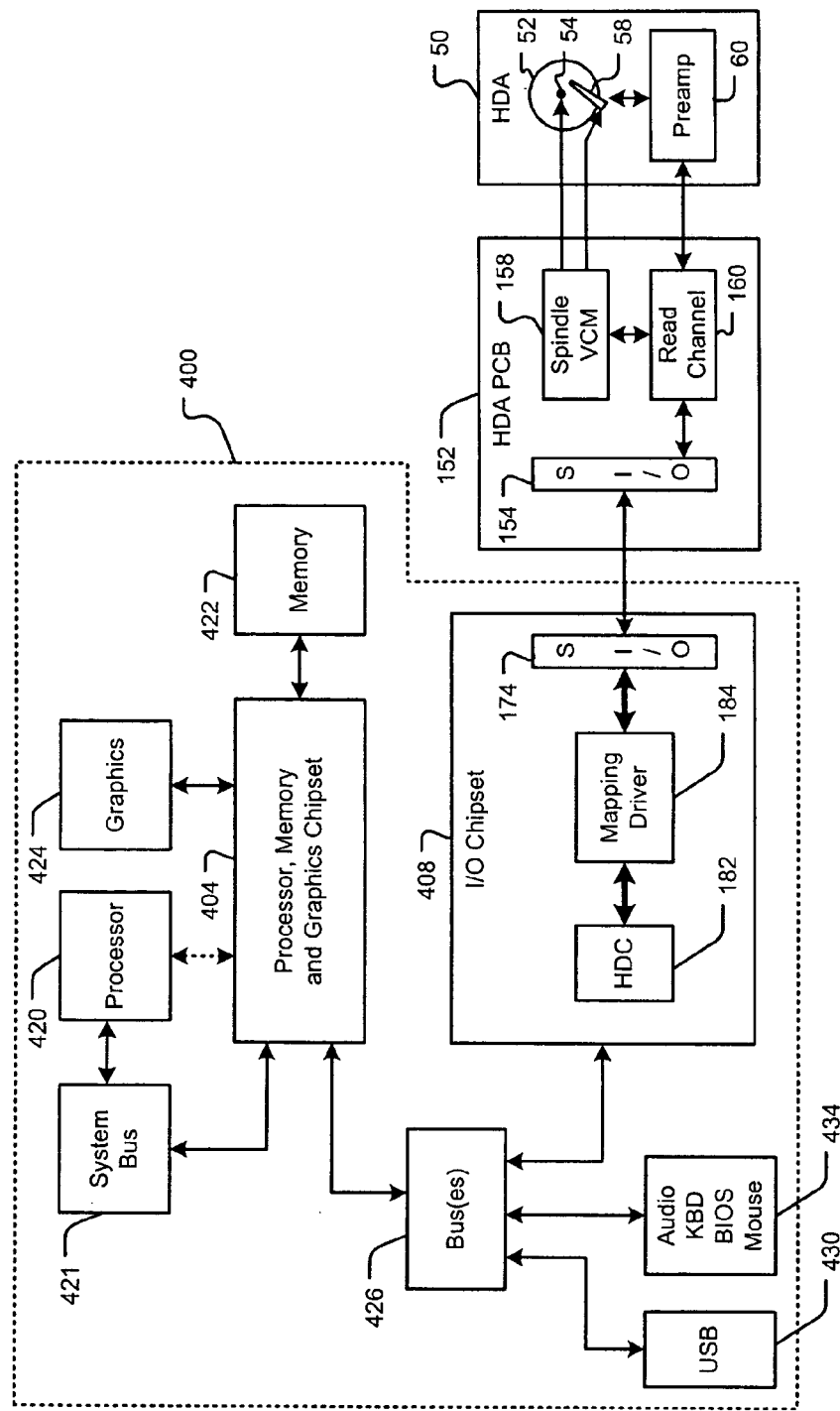
FIG. 10A illustrates a computer with a processor, memory and graphics chipset and an I/O chipset including the HDC and the mapping driver with both data and control information sent in-band over a serial link according to the present invention.

Referring now to FIG. 10A, a computer 400 includes a processor, memory and graphics chipset 404 and an I/O chipset 408. The I/O chipset 408 includes the HDC 182, the mapping driver 184 and the serial I/O interface 174. The I/O chipset 408 also manages the basic forms of input/output (I/O) such as Universal Serial Bus (USB) 430 and audio, keyboard (KBD), mouse, Basic Input/Output System (BIOS), etc. (collectively 434).

The processor, memory and graphics chipset 404 communicates with processor 420 via a bus 421 and controls interaction with memory 422, cache 424, and/or a graphics card 426. For example, the graphics card 426 may be an Accelerated Graphics Port (AGP). The processor, memory and graphics chipset 404 also communicates with the I/O chipset via bus 426.

Figure 10B:
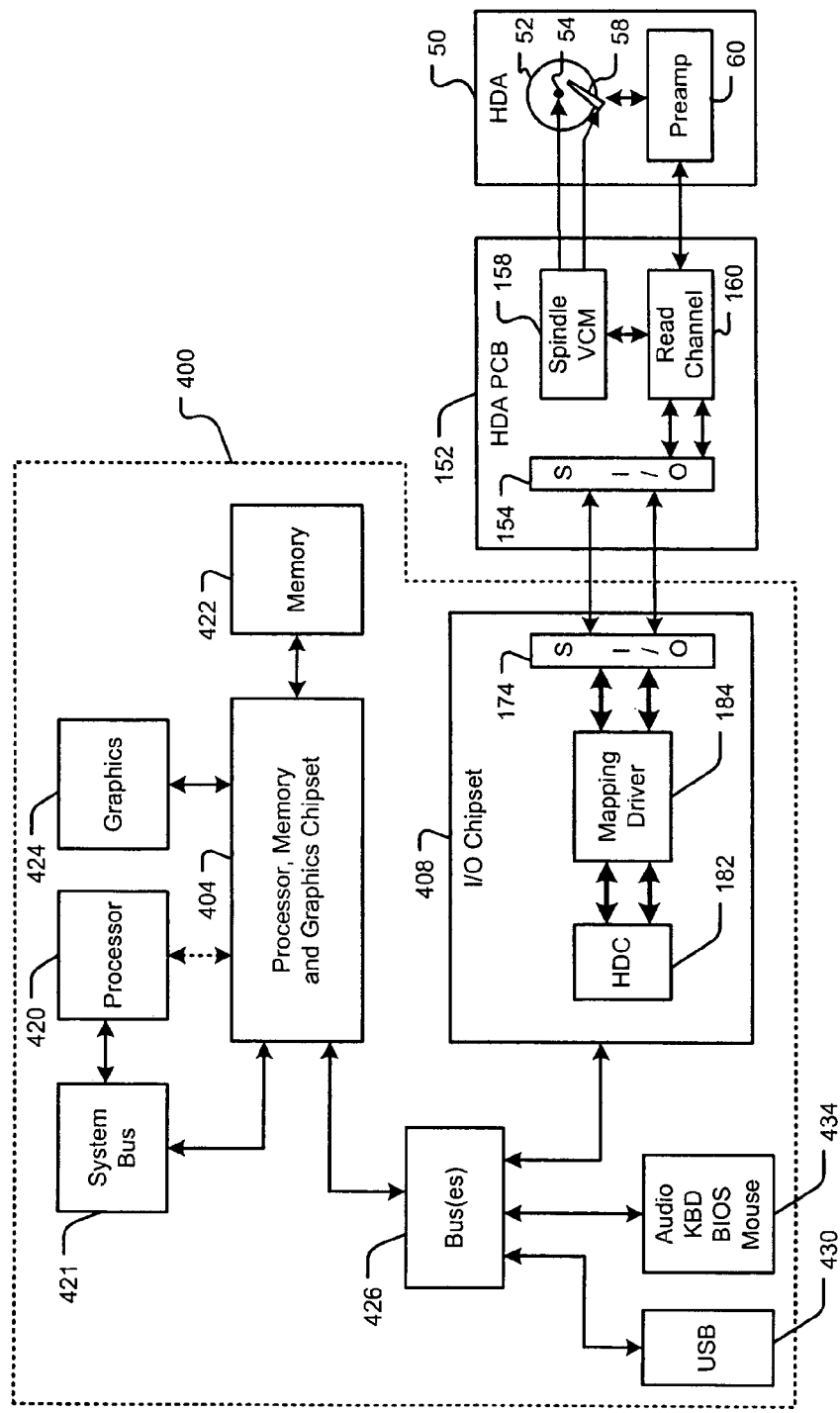
FIG. 10B illustrates a computer with a processor, memory and graphics chipset and an I/O chipset including the HDC and the mapping driver with data sent in-band and control information sent out-of-band over a serial link according to the present invention.

In FIG. 10A, both data and control information are sent in-band over a serial link 410 from the HDC 182 and/or the mapping driver 184 to the read channel 160. In FIG. 10B, the HDC 182 and/or the mapping driver 184 send data in-band and control information out-of-band over a serial link.

Figure 11A:
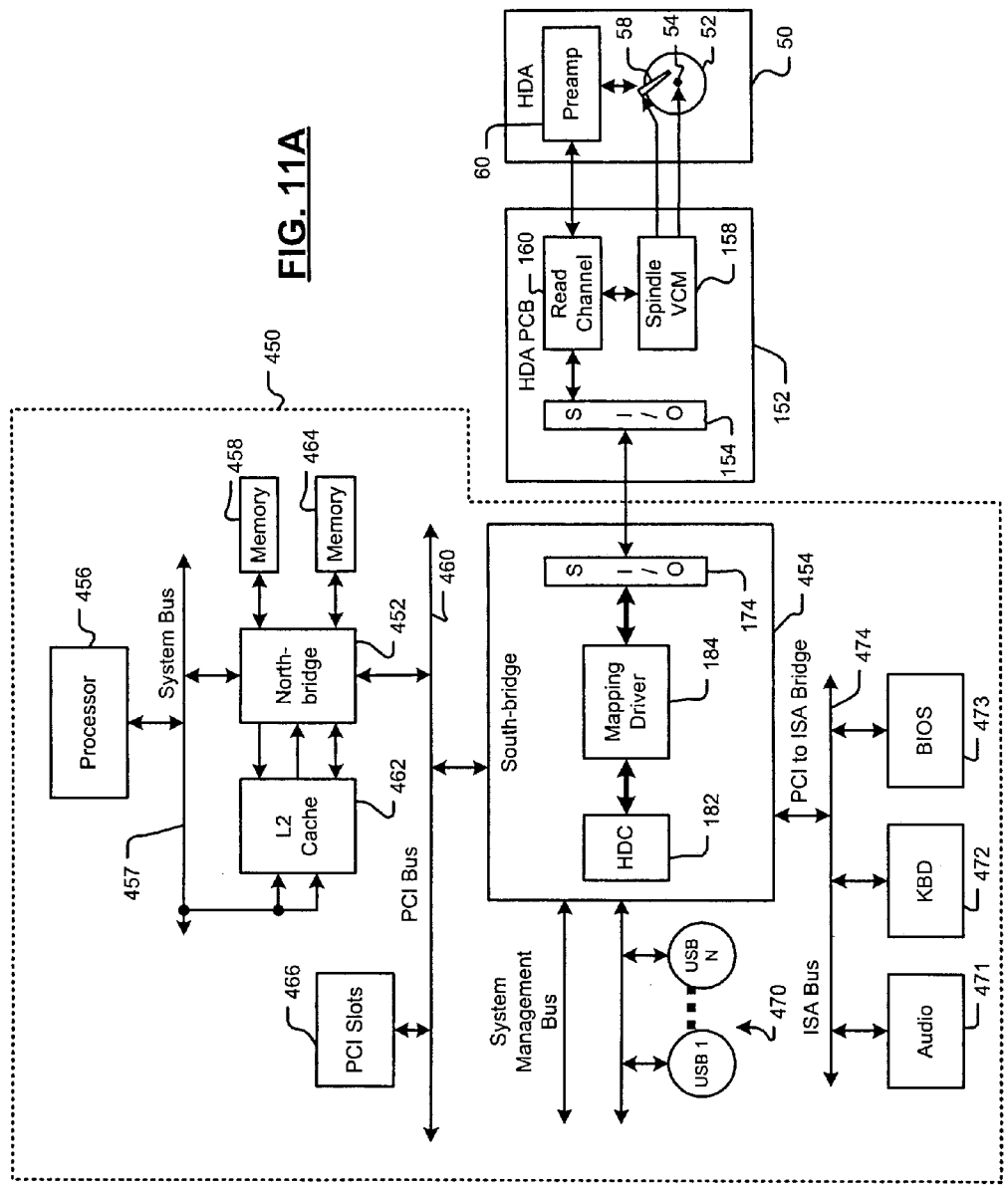
FIG. 11A illustrates a computer with a Northbridge/Southbridge chipset including the HDC and the mapping driver with both data and control information sent in-band over a serial link according to the present invention.

In FIG. 11A, a computer 450 includes a Northbridge chipset 452 and a Southbridge chipset 454. The Southbridge chipset 454 includes the HDC 182, the mapping driver 184 and the serial I/O interface 174. The Northbridge chipset 452 communicates with a processor 456 via a system bus 457 and controls interaction with memory 458, a Peripheral Component Interconnect (PCI) bus 460, Level 2 cache 462, and/or an Accelerated Graphics Port (AGP) 464. The Northbridge 452 is typically but not necessarily implemented using multiple chips. PCI slots 466 interface with the PCI bus 460.

The Southbridge 454 manages the basic forms of input/output (I/O) such as Universal Serial Bus (USB) 470 and audio 471, keyboard (KBD) 472, BIOS 473 via an Industry Standard Architecture (ISA) bus 474. Unlike the Northbridge chipset 452, the Southbridge chipset 454 is typically (but not necessarily) implemented using a single chip, which sits on the Northbridge's PCI bus 460.

Figure 11B:
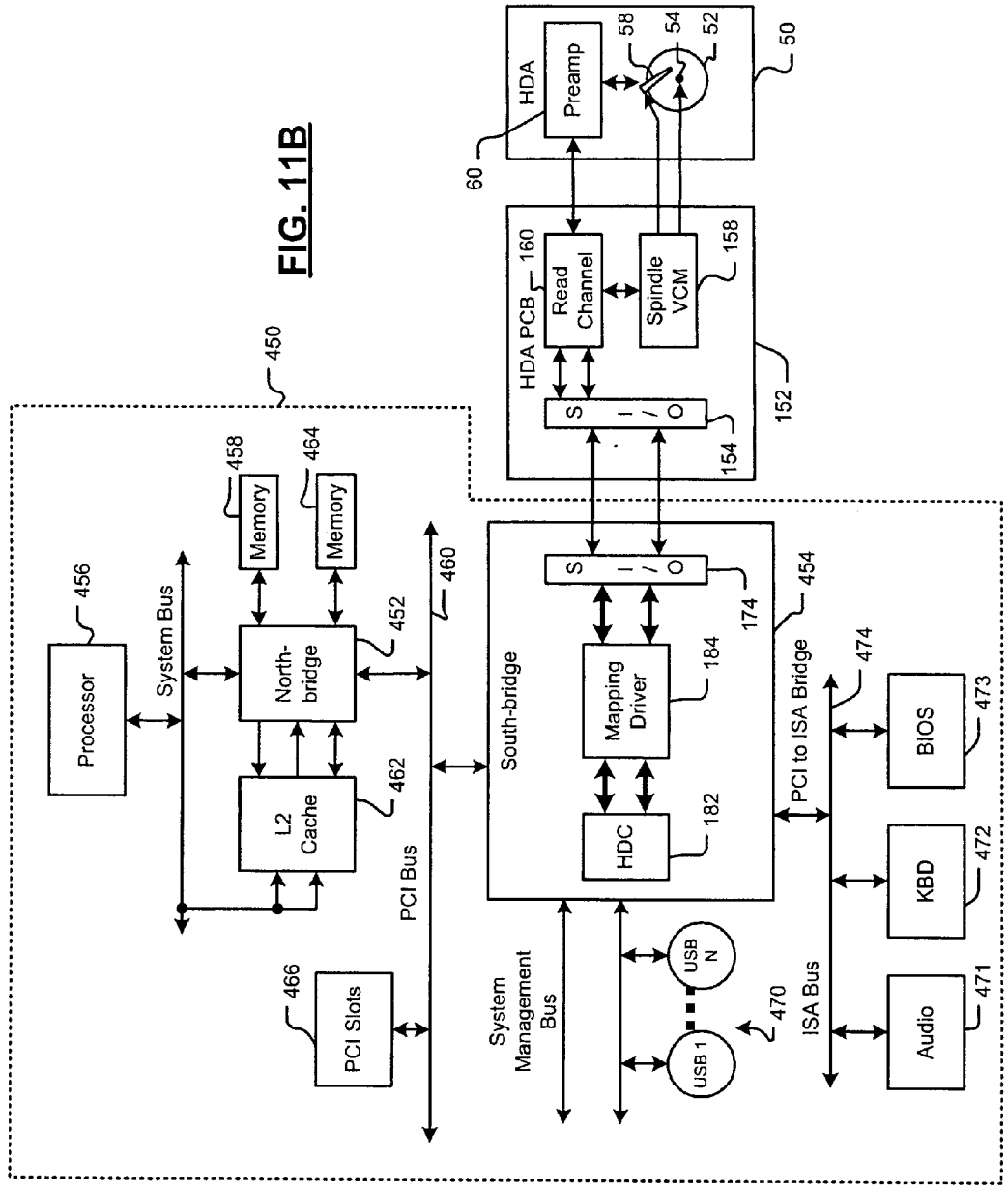
FIG. 11B illustrates a computer with a Northbridge/Southbridge chipset including the HDC and the mapping driver with data sent in-band and control information sent out-of-band over a serial link according to the present invention.

In accordance with the present invention, the Southbridge 422 includes the HDC 182 and/or the mapping driver 184, which operate as described above in conjunction with FIGS. 4A and 4B. In FIG. 11A, both data and control information are sent in-band between the HDC 182 and/or the mapping driver 184 and the read channel 160. In FIG. 11B, data is sent in-band between the HDC 182 and/or the mapping driver 184 and the read channel 160 and control information is sent in out-of-band between the HDC 182 and/or the mapping driver 184 and the read channel 160 (as is represented by dual communication paths in FIG. 11B).

Figure 12A:
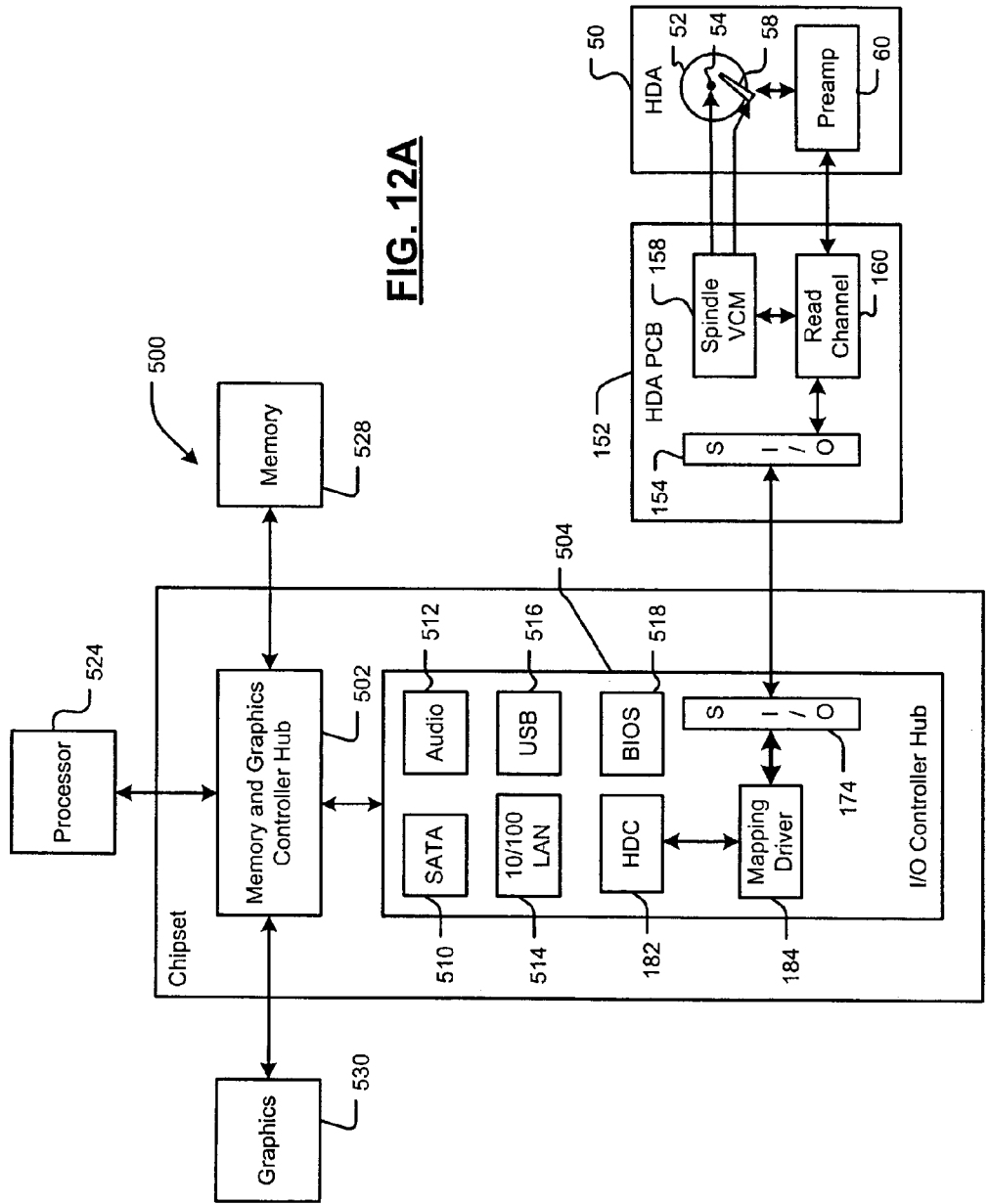
FIG. 12A illustrates a computer with a chipset including a memory and graphics controller hub and an input/output hub with the HDC and the mapping driver with both data and control information sent in-band over a serial link according to the present invention.

Referring now to FIG. 12A, a computer chipset 500 includes a memory and graphics controller hub 502 and an input/output hub 504. In addition to other I/O functions, the I/O hub 504 includes the HDC 182, the mapping driver 184, and the serial I/O interface 174. In addition, the I/O hub 504 provides serial ATA (SATA) 510, audio 512, 10/100 LAN 514, USB 516, BIOS 518 and/or other I/O functions. As can be appreciated, the serial I/O interface 174 may be a SATA interface that is provided by the SATA 510 and/or an additional serial port. The memory and graphic controller hub 502 communicates with a processor 524 and controls interaction with memory 528 and a graphics port 530.

Figure 12B:
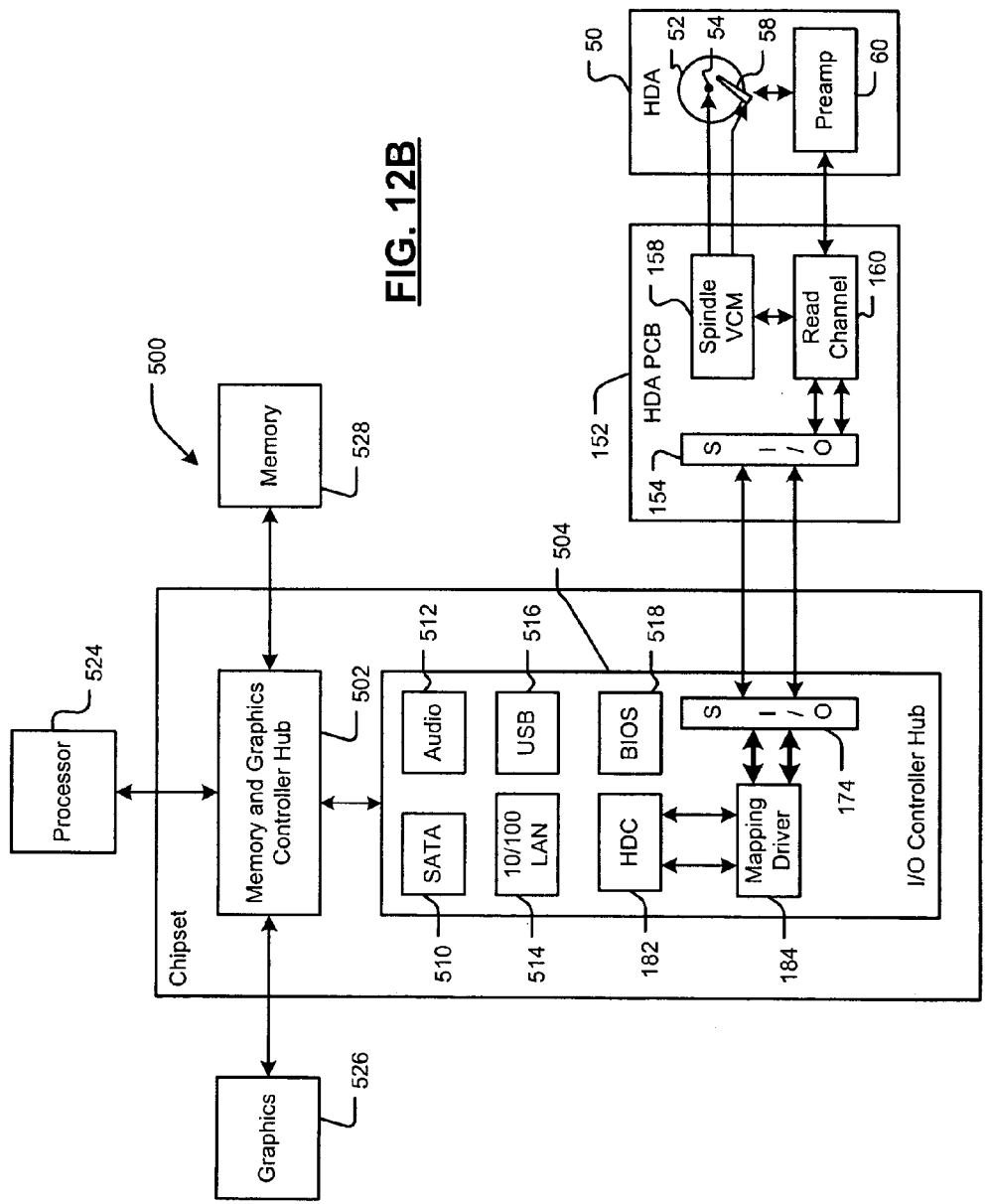
FIG. 12B illustrates a computer with a chipset including a memory and graphics controller hub and an input/output hub that includes the HDC and the mapping driver with data sent in-band and control information sent out-of-band over a serial link according to the present invention.

In FIG. 12A, both data and control information are sent by the HDC 182 and/or mapping driver 184 in-band over a serial link. In FIG. 12B, data is sent by the HDC 182 and/or mapping driver 184 in-band and control information is sent by the HDC 182 and/or mapping driver 184 out-of-band over a serial link.

Figure 13A:
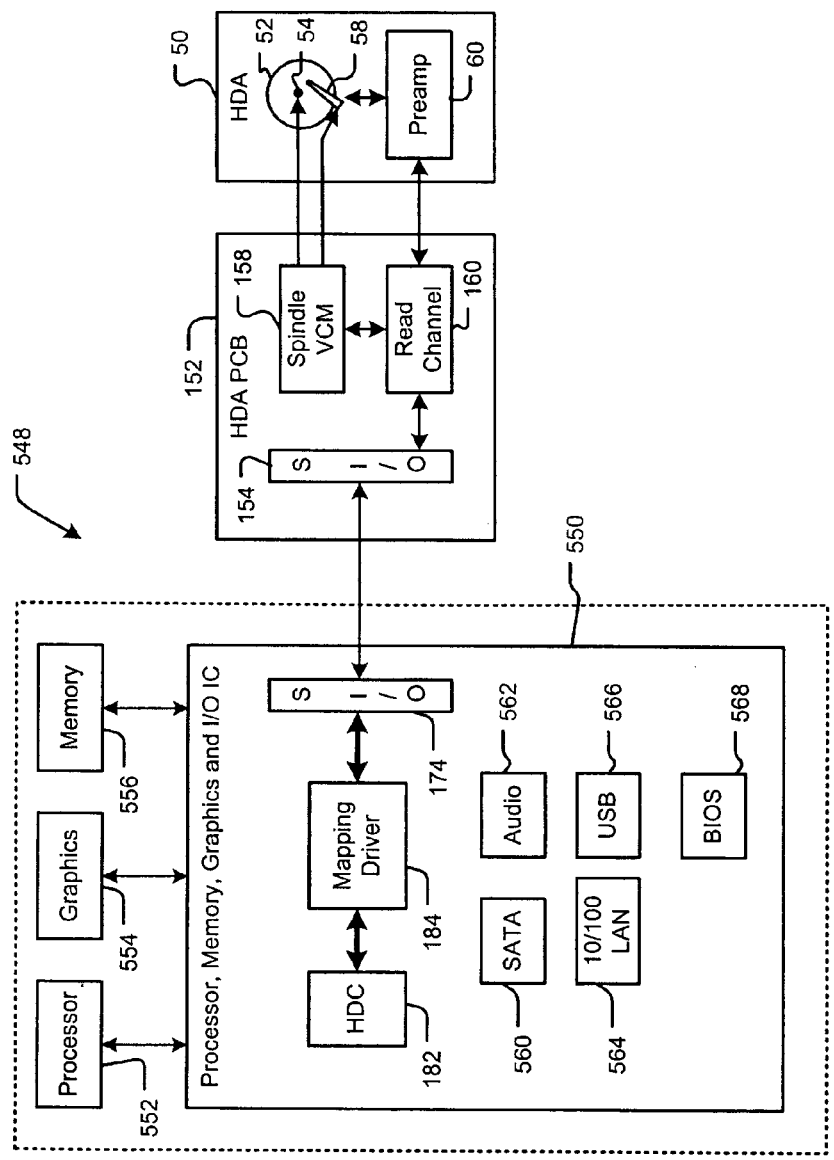
FIG. 13A illustrates a computer with a processor, memory, graphics and I/O integrated circuit that includes the HDC and the mapping driver with both data and control information sent in-band over a serial link according to the present invention.

Referring now to FIG. 13A, a computer 548 includes a processor, memory, graphics and input/output (I/O) chipset 550. The processor, memory, graphics and I/O chipset 550 communicates with a processor 552 and controls interaction with a graphics port 554 and memory 556. In one implementation, the chipset 550 is an integrated circuit. In addition, the processor, memory, graphics and I/O chipset 550 performs I/O functions such as serial ATA (SATA) 560, audio 562, 10/100 LAN 564, USB 566, BIOS 568 and/or other I/O functions that are needed for a particular application.

Figure 13B:
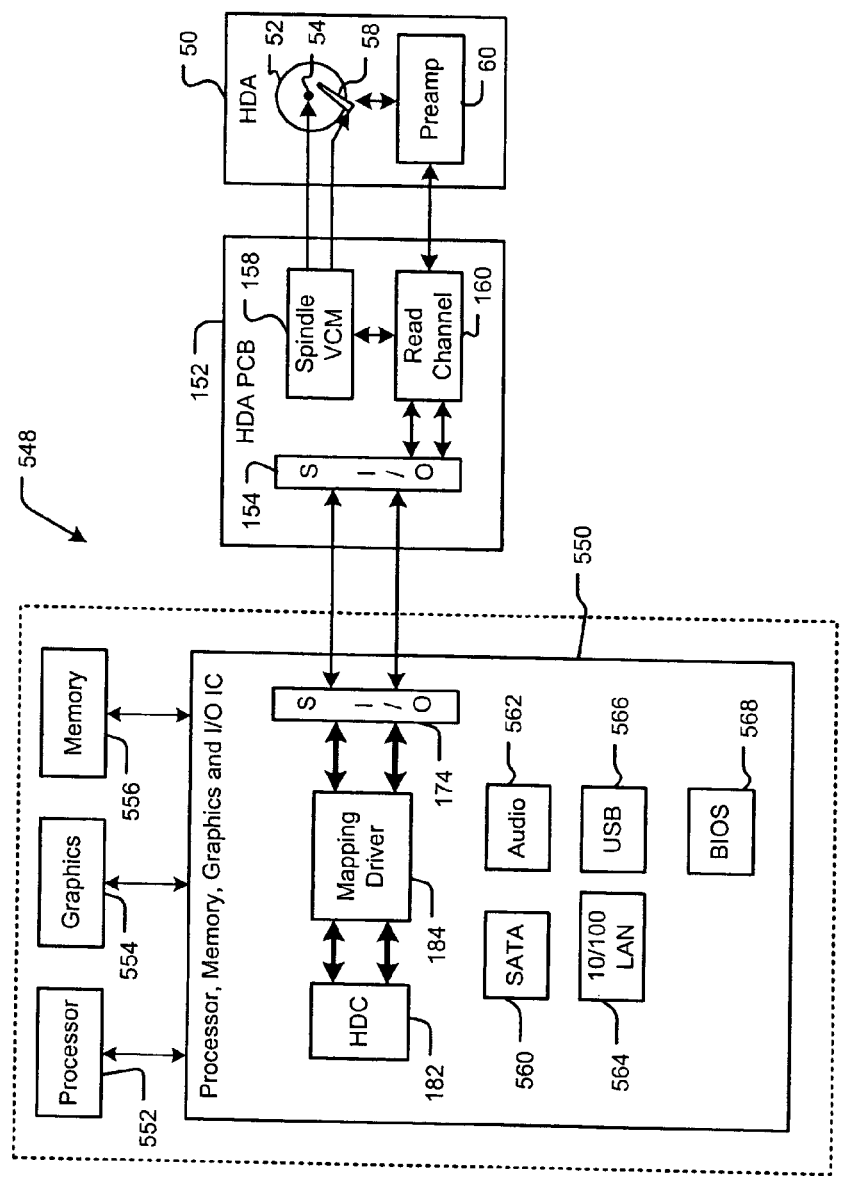
FIG. 13B illustrates a computer with a processor, memory, graphics and I/O integrated circuit that includes the HDC and the mapping driver with data sent in-band and control information sent out-of-band over a serial link according to the present invention.

The processor, memory, graphics and I/O IC 550 also includes the HDC 182, the mapping driver 184, and the serial I/O interface 174. As can be appreciated, the serial I/O interface 174 may be a SATA interface that is provided by the SATA 560 and/or an additional serial port. In FIG. 13A, both data and control information are sent by the HDC 182 and/or mapping driver 184 in-band over a serial link to the read channel 160. In FIG. 13B, data is sent by the HDC 182 and/or mapping driver 184 in-band and control information is sent by the HDC 182 and/or mapping driver 184 out-of-band over a serial link to the read channel 160.

As can be appreciated, the I/O chipset 408, the Southbridge chipset 454, the I/O hub 504, and/or the processor, memory, graphics and I/O chipset 550 can also include a port multiplier that is implemented in a manner that is similar to the port multiplier that is shown in FIG. 5.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An architecture for a data storage device, comprising:
a first data storage device control circuit that includes a first input/output (I/O) interface; and
an application circuit including a buffer that stores application data and data storage device control data, a mapping driver that maps logical addresses to physical addresses, and a second I/O interface that communicates with at least one of said buffer and said mapping driver, wherein said physical addresses and data are transmitted by said second I/O interface to said first I/O interface,
wherein said first data storage device control circuit includes a data storage device controller (DSDC), a data storage device processor, a spindle motor driver, a read/write arm driver, and a read channel driver, wherein said DSDC communicates with said first I/O interface and with at least one of said data storage device processor, said spindle motor driver, said read/write arm driver, and said read channel driver, wherein said application circuit includes at least one of an application specific integrated circuit (ASIC) and an application processor that communicates with said buffer, wherein at least one of said application processor and said ASIC sends a data request to said mapping driver, wherein said mapping driver periodically receives at least one of head location and sector location status from said DSDC, and wherein said mapping driver sends an estimated response time for said data request to said at least one of said application processor and said ASIC.

2. The data storage device architecture of claim 1 wherein said at least one of said application processor and said ASIC schedules at least one task that is not data access related before said estimated response time elapses.

3. An architecture for a data storage device, comprising:
a data storage device control circuit that includes a first input/output (I/O) interface; and
an application circuit including a buffer that stores application data and data storage device control data, a mapping driver that maps logical addresses to physical addresses, a data storage device controller (DSDC), and a second I/O interface that communicates with at least one of said DSDC, said mapping driver and said buffer, wherein:
data to be stored on the data storage device and data storage device control signals including at least one of read/write arm position data and spindle control data are transmitted by said second I/O interface to said first I/O interface;
said data storage device control circuit includes at least one of a spindle motor driver, a read/write arm driver, and a read channel driver that communicate with said first I/O interface;
said application circuit includes at least one of an application specific integrated circuit (ASIC) and an application processor that communicates with said buffer;
at least one of said application processor and said ASIC sends a data request to said mapping driver;
said mapping driver periodically receives at least one of head location and sector location status from said DSDC; and
said mapping driver sends an estimated response time for said data request to said at least one of said application processor and said ASIC.

4. The data storage device architecture of claim 3 wherein said at least one of said application processor and said ASIC schedules at least one task that is not data access related before said estimated response time elapses.

5. An architecture for a data storage device, comprising:
first control means for controlling the data storage device and that includes first interface means for providing an input/output interface for said first control means; and
application means for providing application functionality and including buffer means for storing application data and data storage device control data, mapping means for mapping logical addresses to physical addresses, and second interface means for providing an input/output interface for said application means and for communicating with at least one of said buffer means and said mapping means, wherein:

said physical addresses and data are transmitted by said second interface means to said first interface means;

said first control means includes data storage device controller (DSDC) means for providing data storage device controller functions, data storage device processing means for performing data storage device processing functions, and driving means for providing at least one of a spindle motor driver, a read/write arm driver, and a read channel driver;

said DSDC means communicates with said first interface means and with at least one of said data storage device processing means and said driving means;

said application means includes application processing means for performing application processing and for communicating with said buffer means;

said application processing means sends a data request to said mapping means;

said mapping means periodically receives at least one of head location and sector location status from said DSDC means; and said mapping means sends an estimated response time for said data request to said application processing means.

6. The data storage device architecture of claim 5 wherein said application processing means schedules at least one task that is not data access related before said estimated response time elapses.

7. An architecture for a data storage device, comprising:
first control means for controlling the data storage device and that includes first interface means for providing an input/output interface for said first control means; and
application means including buffer means for storing application data and data storage device control data, mapping means for mapping logical addresses to physical addresses, data storage device controller (DSDC) means for providing data storage device controller functions, and second interface means for providing an input/output interface for said application means and for communicating with at least one of said DSDC means, said mapping means and said buffer means, wherein:
data to be stored on the data storage device and data storage device control signals including at least one of read/write arm position data and spindle control data are transmitted by said second interface means to said first interface means;
said first control means includes driving means for providing at least one of a spindle motor driver, a read/write arm driver, and a read channel driver that communicates with said first interface means;
said application means includes application processing means for performing application processing functions and for communicating with said buffer means;
said application processing means sends a data request to said mapping means;
said mapping means periodically receives at least one of head location and sector location status from said DSDC means; and
said mapping means sends an estimated response time for said data request to said application processing means.

8. The data storage device architecture of claim 7 wherein said application processing means schedules at least one task that is not data access related before said estimated response time elapses.

9. A method for operating a data storage device, comprising:

storing application data and data storage device control data in a buffer associated with an application circuit;

mapping logical addresses to physical addresses using said application circuit;

transmitting said physical addresses and data from said application circuit to a data storage device circuit;

sending a data request using said application circuit;

periodically receiving at least one of head location and sector location status data from said data storage device control circuit; and estimating a response time for said data request from said head location and sector location status data.

10. The method of claim 9 further comprising scheduling at least one task that is not data access related before said estimated response time elapses.

11. A method for providing an architecture for a data storage device, comprising:

storing application data and data storage device control data in an application circuit;

mapping logical addresses to physical addresses using said application circuit;

transmitting data to be stored on the data storage device from said application circuit to said data storage device control circuit;

transmitting data storage device control signals including at least one of read/write arm position data and spindle control data from said application circuit to said data storage device control circuit;

generating a data request using said application circuit;

periodically monitoring at least one of head location and sector location status using said application circuit; and generating an estimated response time for said data request.

12. The method of claim 11 further comprising scheduling at least one task that is not data access related before said estimated response time elapses.

13. A processor chipset that communicates with a data storage device, comprising:
an input/output (I/O) circuit that provides an I/O interface for at least one of serial, audio, basic input/output system (BIOS), local area network, mouse, and keyboard connections and that includes:
a mapping driver that maps logical addresses to physical addresses;
a data storage device controller (DSDC) that communicates with said mapping driver and that controls the data storage device; and
a first I/O interface that communicates with at least one of said DSDC and said mapping driver, wherein data to be stored on the data storage device and data storage device control signals including at least one of read/write arm position data and spindle control data are transmitted by said first I/O interface to the data storage device; and
a processor that performs at least one of data and control processing and that communicates with said I/O circuit, wherein said processor sends a data request to said mapping driver, wherein said mapping driver periodically receives at least one of head location and sector location status from said DSDC, and wherein said mapping driver sends an estimated response time for said data request to said processor.

14. The processor chipset of claim 13 wherein said processor schedules at least one task that is not data access related before said estimated response time elapses.

15. A processor chipset that communicates with a data storage device, comprising:

processor chipset input/output (I/O) means for providing an I/O interface to said processor chipset for at least one of serial, audio, basic input/output system (BIOS), local area network, mouse, and keyboard connections and that includes:

mapping means for mapping logical addresses to physical addresses;

data storage device controller (DSDC) means that communicates with said mapping means for controlling the data storage device; and first I/O interface means for communicating with at least one of said DSDC means and said mapping means, wherein data to be stored on the data storage device and data storage device control signals including at least one of read/write arm position data and spindle control data are transmitted by said first I/O interface means to the data storage device; and processing means that communicates with said processor chipset I/O means for performing at least one of data and control processing, wherein said processing means sends a data request to said mapping means, wherein said mapping means periodically receives at least one of head location and sector location status from said DSDC means, and wherein said mapping means sends an estimated response time for said data request to said processing means.

16. The processor chipset of claim 15 wherein said processing means schedules at least one task that is not data access related before said estimated response time elapses.

* * * * *

UNITED STATES PATENT AND TRADEMARK OFFICE
CERTIFICATE OF CORRECTION

PATENT NO. : 7,308,530 B1  
APPLICATION NO. : 10/679030  
DATED : December 11, 2007  
INVENTOR(S) : Alan Armstrong et al.

Page 1 of 1

It is certified that error appears in the above-identified patent and that said Letters Patent is hereby corrected as shown below:

Column 1, Line 25   Insert -- with -- after "associated"

Signed and Sealed this

Twenty-ninth Day of April, 2008

JON W. DUDAS  
*Director of the United States Patent and Trademark Office*